INVENTOR.
J. E. COTTLE
BY Young & Quigg
ATTORNEYS

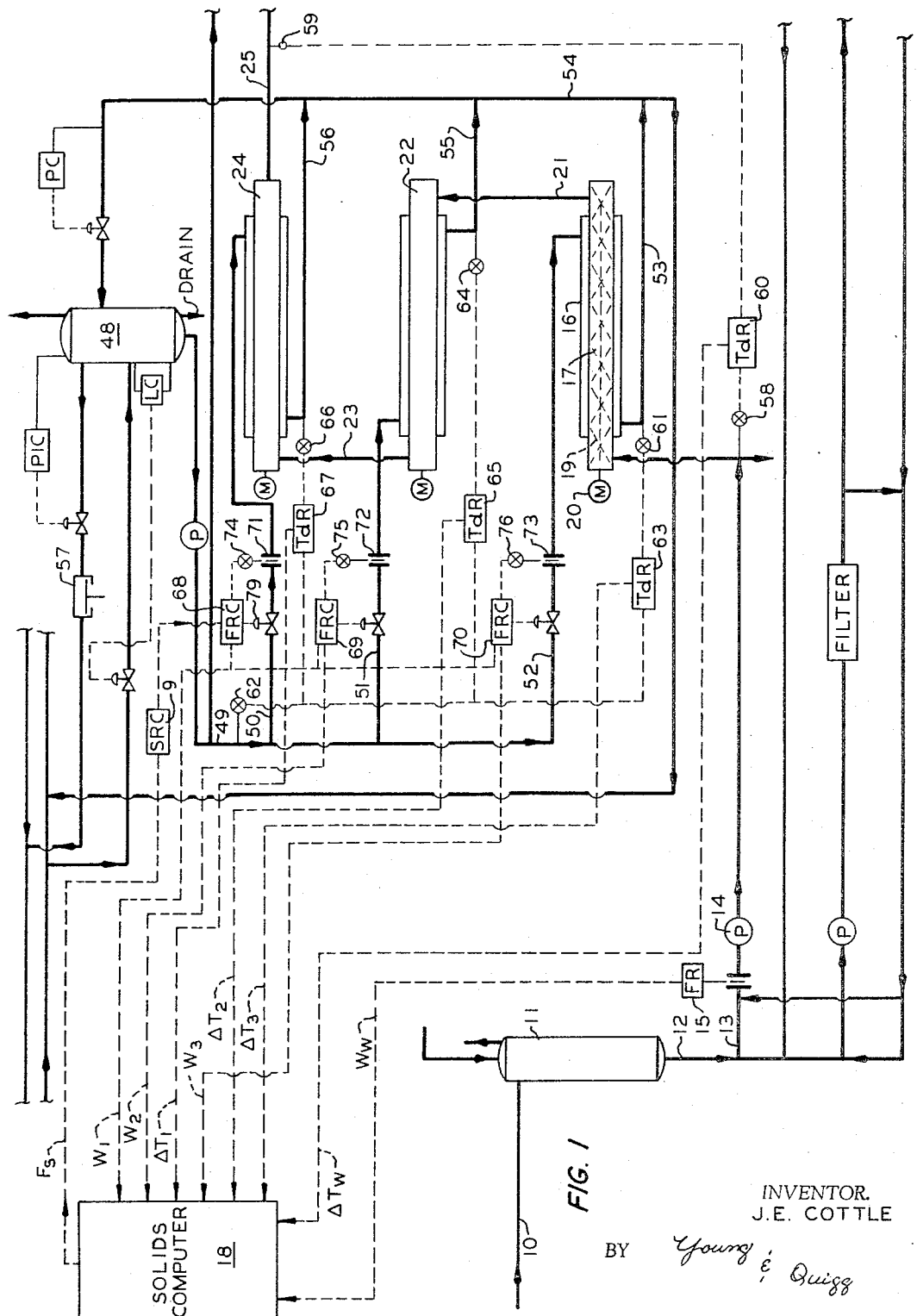

Jan. 23, 1968  J. E. COTTLÉ  3,364,691
CRYSTALLIZATION

Filed June 25, 1962  3 Sheets-Sheet 3

INVENTOR.
J. E. COTTLE
BY Young & Quigg
ATTORNEYS

United States Patent Office 3,364,691
Patented Jan. 23, 1968

3,364,691
CRYSTALLIZATION
John E. Cottle, Bartlesville, Okla., assignor to Phillips Petroleum Company, a corporation of Delaware
Filed June 25, 1962, Ser. No. 205,133
2 Claims. (Cl. 62—58)

ABSTRACT OF THE DISCLOSURE

Solids content of the effluent slurry from a scraped surface chiller is automatically computed in response to a heat balance around the chiller. The solids content is controlled at a desired level by manipulating the supply of refrigeration to the chiller.

---

This invention relates to the separation and purification of components of multi-component mixtures. Broadly, it relates to a method for determining the solids content of a solid-liquid slurry. In one aspect, it relates to the separation and purification of components of a multi-component mixture by fractional crystallization. In another aspect, it relates to means for controlling the solids content of a slurry supplied to the purification column of fractional crystallization apparatus. In still another aspect, it relates to a method for controlling the solids content of a slurry produced by a chiller used in fractional crystallization apparatus.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may be the only method which can be advantageously employed.

As well as offering in many cases perhaps the only practicable method of separation, the crystallization method offers the further advantage of being the only separation method which in the case of eutectic-forming systems theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurities since the concentration of impurity in the new liquor is less than in the previous liquor of crystallization. Such processes require a large amount of equipment and floor space for their operation with resulting high operating expenditures in terms of labor and equipment costs. Furthermore, in these types of processes the purity of the product is limited by the number of stages through which the process is carried.

More recently, a continuous method of separating and purifying multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column, crystals are separated from mother liquor in one end and then passed toward the other end in which a melting section is maintained. The crystals are melted in the melting section and a portion of the melt is withdrawn as product. The remainder of the melt is displaced countercurrently to the movement of crystals and in intimate contact therewith so as to remove occluded impurities.

When practicing the above-described crystal separation and purification method, it has been found to be desirable to supply to the separation and purification column a slurry which has a constant solids content. When operating in this manner, the production of a high purity product in high yields is greatly facilitated. It also makes possible a steady operating procedure in which fluctuations in product yield and product purity are reduced to a minimum. Furthermore, when practicing the above-described method, it is often desirable to maintain the solids content of the slurry as high as possible while still producing a slurry which is capable of flowing. In order to maintain a high solids content slurry, close control over the refrigeration process whereby the solids are formed is required.

Particularly, control of the crystal (solids) content of the crystallizer effluent is difficult with many aqueous systems. This is because the freezing-point lowering curves for these systems have a higher slope with the result that the solids content of the system changes appreciably for a 1- or 2-degree change in temperature. Temperature measurement of the chiller effluent is therefore not a sufficiently accurate indication of solids content for control purposes. Should the temperature vary by 2 or 3 degrees, for example, the solids content will vary from about 30 to 40 percent. The latter variations is too great, i.e., the lower solids content is too thin for the crystal purification column and the higher solids content may plug the chiller. More accurate measurement and control of the solids content is needed.

In accordance with the present invention, I have now found a method and apparatus for computing and controlling the solids content of a chiller effluent in response to a measurement of the heat removed from the chiller, which can be advantageously used with all systems, particularly with those exhibiting large changes in solids content with small changes in temperature.

Thus it is an object of this invention to provide improved fractional crystallization apparatus.

Another object of this invention is to provide an improved process for the separation of components of multi-component mixtures.

Still another object of the invention is to provide fractional crystallization apparatus comprising an improved crystal forming means having associated therewith means for controlling the solids content of the crystal slurry.

Still another object of the invention is to provide apparatus for controlling the refrigeration requirements of a chiller in response to a measurement of the heat removed in the refrigeration system.

A still further object of this invention is to provide a method for controlling the refrigeration requirements of a chiller so as to obtain a slurry having a desired solids content.

Other objects, aspects, and the several advantages of the invention will become apparent to one skilled in the art upon consideration of the accompanying disclosure, drawings and appended claims.

FIGURES 1 and 1a are diagrammatic views of the process of this invention.

Figure 1A:
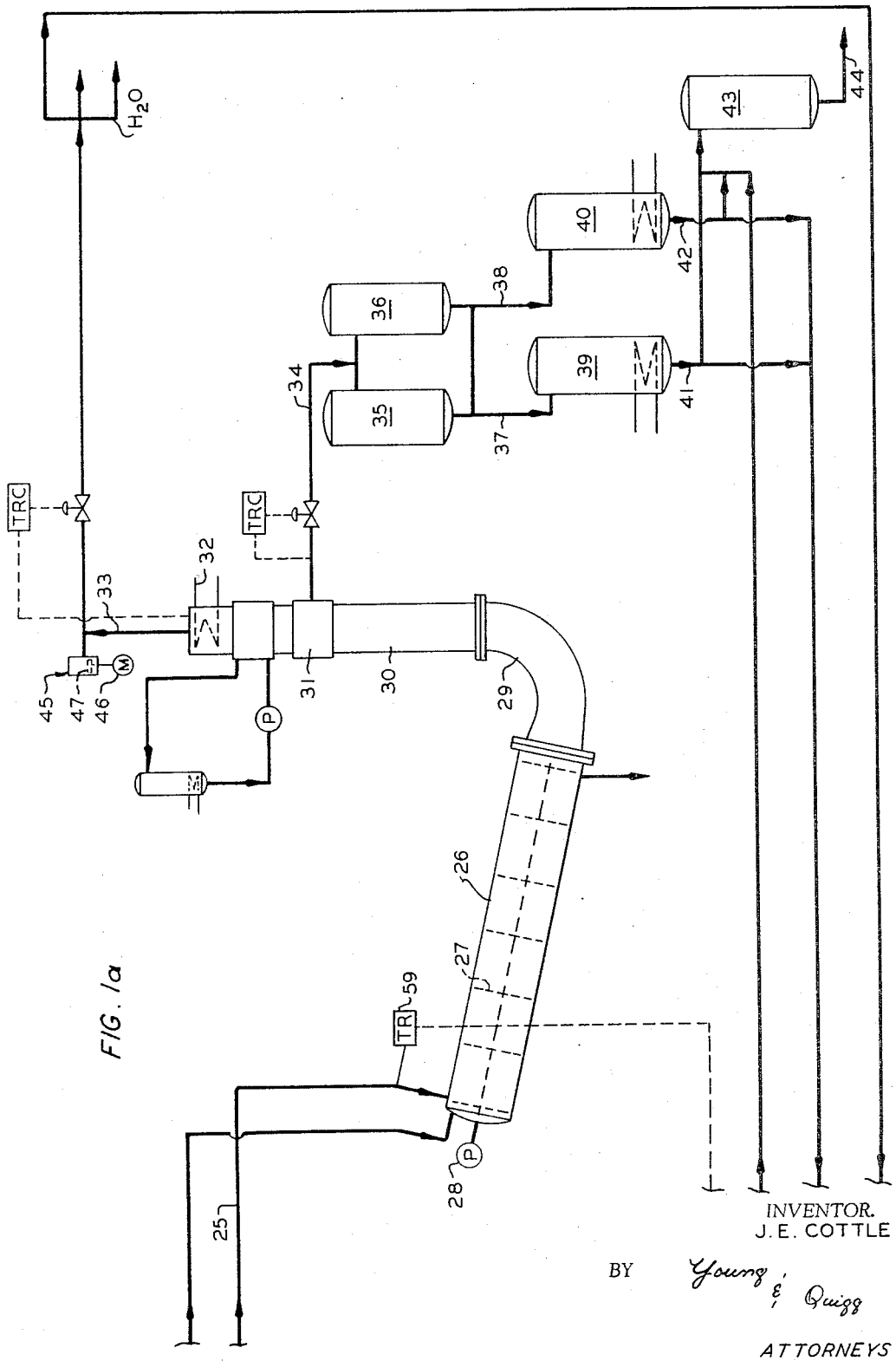

Broadly speaking, the present invention is directed to the separation and purification of components of multi-component mixtures and involves controlling the operation of the chillers or crystallizers so as to provide a slurry having a desired constant solids content. The control method of this invention is based upon the discovery that the solids content of the chiller effluent could be measured by making a heat balance around the chiller. The heat removed by the liquid refrigerant is measured and equated to the heat given up by the system being cooled and partially frozen. The equation is as follows:

Heat removed by liquid refrigerant in the chiller assuming no vaporization of said liquid: $Q_A = W_1 CP_A \Delta T_1$ If several chillers are used in series, for instance three chillers, then $$Q_A = W_1 CP_A \Delta T_1 + W_2 CP_A \Delta T_2 + W_3 CP_A \Delta T_3,$$

where $Q_A$ = heat removed B.t.u./hr.
$W_1, W_2, W_3$ = flow of liquid refrigerant in chillers, lb./hr.
$CP_A$ = specific heat of liquid refrigerant, B.t.u./lb. per ° F.
$\Delta T_1, \Delta T_2, \Delta T_3$ = temperature differential of liquid refrigerant in and out of chillers.

For the case of an aqueous system being chilled, the heat given up by the system is:

$$Q_W = W_W \cdot CP_W \cdot \Delta T_W + F_s \cdot W_W \cdot L_F$$

where $Q_W$ = heat given up by aqueous system, B.t.u./hr.
$W_W$ = flow rate of aqueous system, lb./hr.
$CP_W$ = specific heat of water, B.t.u./lb. per ° F.
$\Delta T_W$ = temperature difference of aqueous system into chiller and out of chiller, ° F.
$F_s$ = fraction of solids in chiller effluent.
$L_F$ = latent heat of fusion of water, B.t.u./lb.

Equating $Q_A = Q_W + Q_L$ where $Q_L$ = heat leak into chillers including energy imparted by scrapers, B.t.u./hr.

Substituting $$W_1 CP_A \Delta T_1 + W_2 CP_A \Delta T_2 + W_3 CP_A \Delta T_3 \\ = W_W \cdot CP_W \Delta T_W + F_s W_W L_F + Q_L$$

Rearranging $$F_s = \frac{CP_A(W_1 \Delta T_1 + W_2 \Delta T_2 + W_3 \Delta T_3) - W_W CP_W \Delta T_W - Q_L}{W_W L_F}$$

The above equation is for the case where the liquid refrigerant does not boil in the chiller jacket, i.e., only sensible heat of the liquid refrigerant is used in removing heat from the system being chilled. In many cases, the liquid refrigerant is allowed to boil in the chiller jacket, thus utilizing the latent heat of vaporization of the refrigerant in chilling the system to be crystallized. In the latter case, the heat removed by the refrigerant for a single chiller becomes:

$$Q_A = W_1(CP_A \cdot \Delta T_1 + L_A)$$

where $L_A$ = latent heat of vaporization of refrigerant, B.t.u./lb. other terms are as before.

The final equation for three chillers in series then becomes:

$$F_s = \frac{W_1(CP_A \Delta T_1 + L_A) + W_2(CP_A \Delta T_2 + L_A) + W_3(CP_A \Delta T_3 + L_A) - W_W CP_W \Delta T_W - Q_L}{W_W L_F}$$

As shown in the accompanying drawing, which is a diagrammatic view of the overall process and the manner in which the measured values of the flow rates and temperatures are provided to the computer, a solution to be concentrated is directed through conduit 10 to the inlet of a surge tank 11 from which it is withdrawn by means of pump 14 through conduits 12 and 13 and introduced to the inlet of a scraped surface chiller 17. Flow-recorder 15 is so adapted into conduit 13 as to provide to the solids computer 18 the value $W_W$ (flow rate of the aqueous system in pounds per hour) through the conduit. Chiller 17 is provided with a jacket 16 through which a refrigerant such as ammonia is circulated. The scraper 19 within chiller 17 is rotated by motor 20. The feed solution is cooled in chiller 17 to form crystals of the solvent. The slurry from chiller 17 is directed through conduit 21 to a second chiller 22 from which it is passed by means of conduit 23 to a third chiller 24 in the series which then serves to reduce the burden on any one of the chillers and aids in maintaining the desired amount of solvent crystals. It is generally desirable to continue the cooling until the slurry from the last chiller contains about 35 to 40 weight percent of solvent crystals. If too much cooling is provided, the resultant slurry is difficult to handle and a solid mass of crystals conceivably can be formed. The slurry from chiller 24 is directed through conduit 25 to the inlet of a crystal growing tank 26. Tank 26 is provided with an agitator 27 which is rotated by motor 28. The residence time in tank 26 is generally on the order of 1 to 10 hours. From the viewpoint of crystal growth, even longer times are desirable. However, it generally is not economical to provide sufficiently large tanks to permit longer growth time. Also, the multiple chillers provide additional time for crystal growth.

The outlet of tank 26 is in direct communication with the vertically positioned elbow-shaped conduit 29 which then places the tank in direct communication with the inlet of crystal purification column 30. A filter 31 is disposed in the central region of the vertical column 30. The filter forms the continuation of the inner wall of the column to permit the crystals to move through the column toward the melting region in the upper end of the column.

A heater 32 is disposed in the upper end of the column. A portion of the resultant crystal melt is removed through the outlet conduit 33. The remainder of the melt flows backward through the column to reflux the crystal mass which moves toward the heating zone. Mother liquor passes through filter 31 and is removed through conduit 34 to gauging tanks 35 and 36 from which it is then removed by means of conduits 37 to mother liquor hold tanks 39 and 40. The mother liquid is then removed by means of conduits 41 and 42 to concentrate hold tank 43 from which it can be withdrawn by means of conduit 44 for subsequent use.

Pressure pulses are applied to the column to facilitate movement of the crystal mass therethrough. This can be accomplished by means of reciprocating pump assembly 45, a motor 46, driving a piston 47 and the pump assembly 45 back and forth at a predetermined rate to apply pressure pulses to the liquid being removed through conduit 33. The operation of the pulsing means and the advantages thereof are described in the Thomas patent, 2,854,494, in detail.

Refrigerant for chillers 17, 22 and 24 is provided by refrigeration knock-out drum 48. Cool liquid refrigerant is directed from knock-out drum 48 to jackets of chillers 17, 22 and 24 through conduits 49, 50, 51 and 52. The spent coolant is returned from the jackets of the chillers to knock-out drum 48 through conduits 53, 54, 55 and 56. The refrigerant vapor is returned from this drum to compressor 57 wherein it is compressed, then passed to condenser not shown, and the liquid returned to the lower level of drum 48.

Conduits 13 and 25 have provided therein temperature sensing means 58 and 59 which sense the temperature of the material in the particular conduits and pass same to temperature-difference-recorder 60 which in turn provides a signal to solids computer 18 which is representative of the value $\Delta T_W$ which is the temperature difference of the aqueous system into and out of the chiller. Refrigerant conduits 53 and 49 have adapted therein sensing means 61 and 62 which sense the temperature in the respective conduits to and from chiller 17 and submit a signal representative of same to temperature-difference-recorder 63 which in turn relays the value $\Delta T_3$ to solids computer 18. Similarly, conduit 55 has adapted therein sensing means 64 which provides a signal representative of the temperature of the effluent refrigerant from chiller 22 to the temperature-difference-recorder 65 which also receives a signal from recorder 62 representative of the temperature in conduit 49 and thereby provides a signal $\Delta T_2$ to the solids computer 18. Conduit 56 is provided with sensing means 66 which communicates with temperature-difference-recorder 67 which after comparing the signal from recorder 66 with that from recorder 62 transmits a signal to solids computer 18 which is representative to the value $\Delta T_1$. Conduits 50, 51, and 52 are provided with flow-recording-controllers 68, 69 and 70, respectively, which in response to measuring means 71, 72 and 73 and transmitters 74, 75 and 76 provide to the solids computer the signal representative of the value for $W_1$, $W_2$, and $W_3$ which is the rate of flow of coolant through the individual chiller jackets. Upon receipt of the various signals, the computer 18 solves the equation $$F_s = \frac{CP_A(W_1\Delta T_1 + W_2\Delta T_2 + W_3\Delta T_3) - W_W CP_W \Delta T_W - Q_L}{W_W L_F}$$

and thereby provides a signal F to solids recording controller 9 which manipulates the set point of flow controller 68 which in turn is used to regulate motor valve 79 which controls the flow of coolant through conduit 50 to chiller 24 and thereby serves to hold the solids content at the desired set point level of about 37 percent. The flow of refrigerant to the first two chillers can be manually set to supply about 70 percent of the total load, 35 percent to each chiller.

The above is where the refrigerant does not boil in the chiller jackets. If the refrigerant boils, the operation is the same except that the following equation is used:

$$F_s = \frac{W_1(CP_A\Delta T_1 + L_A) + W_2(CP_A\Delta T_2 + L_A) + W_3(CP_A\Delta T_3 + L_A) - W_W CP_W \Delta T_W - Q_L}{W_W L_F}$$

Figure 2:
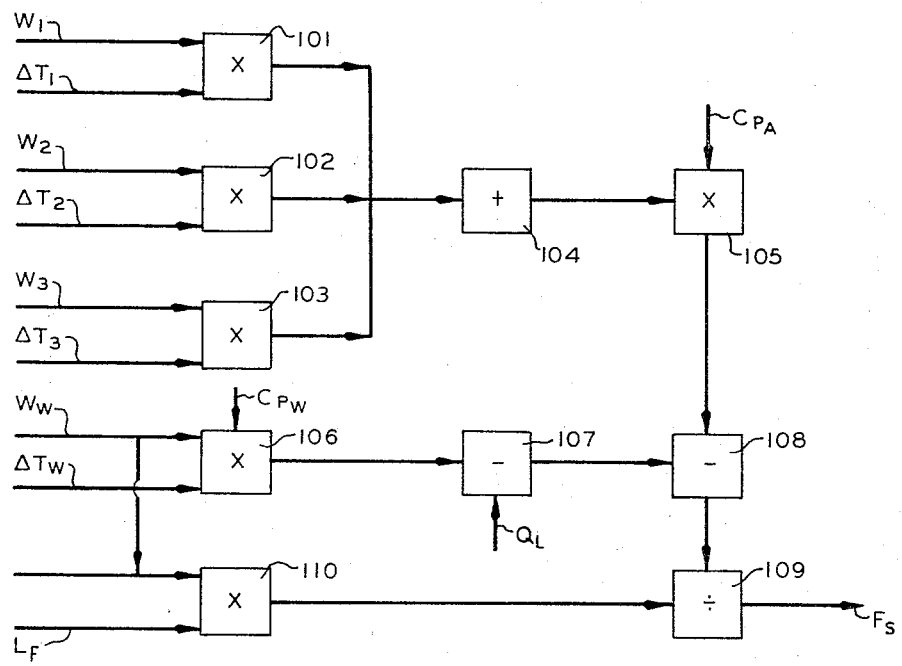
FIGURE 2 illustrates the function of the solids computer 18 of FIGURE 1.

The computer represented in FIGURE 2 serves to provide a signal representative of the solids content of the effluent of the chiller. A signal representative of the values $W_1$ and $\Delta T_1$ is introduced to multiplier 101. Similarly, values $W_2$ and $\Delta T_2$ are supplied to multiplier 102, and values $W_3$ and $\Delta T_3$ are supplied to multiplier 103. The sulting values are then introduced to summer 104 and the total is then multiplied by the $CP_A$ (the specific heat of liquid refrigerant) in 105. A signal representative of the flow rate of feed $W_W$ is introduced to multiplier 106 along with the value $\Delta T_W$ wherein it is multiplied by $CP_W$ (the specific heat of water). The value is then transmitted to subtractor 107 where a signal representative of $Q_L$ (heat leak) is introduced and the total is relayed to subtractor 108. A signal representative of the remainder is relayed to divider 109. The values $W_W$ and $L_F$ are introduced to multiplier 110 and the product conveyed to divider 109. The resulting value of the operation of 109 serves to give a signal $F_s$ which is representative of the solids content of the slurry.

In order to describe the process of this invention in greater detail, reference is made to a specific procedure for concentrating beer. The feed stream of the beer to be concentrated is applied through conduit 13 to chiller 17. The beer is cooled in chillers 17, 22 and 24 until the temperature is reduced to about 14° F. Various recording and controlling means are adapted to the conduits serving the chillers and supply the requisite data to solids computer 18. Fro mthe data received the percent solids in the beer stream leaving chiller 24 is determined and the computer then issues a signal to solids controller 9 which then regulates the amount of coolant passed through the chiller 24 and thus serves to maintain the slurry at about 37 weight percent ice crystals. The ice crystals in the slurry are permitted to grow in tank 26 and the resulting slurry is eventually introduced into column 30. The melt removed through conduit 33 is at a temperature of about 100° F. The mother liquor removed through conduit 34 is at a temperature of about 14° F.

A material balance of the system based on introduction of feed at the rate of about 107 gallons per hour is set forth in the following table.

TABLE

| | Component | | | | | | |
|---|---|---|---|---|---|---|---|
| | Beer Feed | Recycle M.L. | Chiller Feed | Column Feed | Column Mother Liquor | Concentrate Product | Water |
| Conduit | 10 | 44 | 49 | 29 | 34 | 41 | 33 |
| Ethyl Alcohol | 34 | 136 | 170 | 170 | 170 | 34 | Tr |
| Soluble Solids | 45 | 180 | 225 | 225 | 225 | 45 | Tr |
| Water (liquid) | 813 | 592 | 1,405 | 739 | 739 | 147 | 666 |
| Water (ice) | | | | 666 | | | |
| Total lb./hr | 892 | 908 | 1,800 | 1,800 | 1,134 | 226 | 666 |
| G.p.h. (flowing) | 107 | 109 | 216 | 223 | 136 | 27 | 80 |
| Weight percent ice | | | | 37.0 | | | |
| Weight percent alcohol | 3.96 | 18.7 | 10.8 | | 18.7 | 18.7 | 0.05 |
| Temperature, ° F | 40 | 14 | 23 | 14 | 14 | 14 | 40 |
| B.p.h | 3.5 | 3.5 | 7.0 | 7.2 | 4.4 | 0.9 | 2.6 |

Based upon the above material balance, the amount of heat removed necessary to cool feed from 23° F. to 14° F.$=Q_W$.

$Q_W = W_W \cdot CP_W \cdot \Delta T_W + F_s \cdot W_W \cdot L_F$
$\Delta T = 9°$ F.
$Q_W = (1800)(9)(0.865) + (1800)(0.37)(144) + Q_L$
$Q_L = $ heat leak $= 5,000$
$Q_W = 115,000$ B.t.u./hr.

The first chiller 17 removed 45,000 B.t.u. with ammonia in at $-20°$ F. and out at 0° F.

$\Delta T = 20$ $$NH_3 \text{ flow} = \frac{45,000}{(20)(1.08)} = 2,080 \text{ lb./hr.}$$

The second chiller 22 removes 40,000 B.t.u./hr.
$NH_3$ flow $= 1850$ lb./hr.

The third chiller removes 30,000 B.t.u./hr.
$NH_3$ flow $= 1390$ lb./hr.

Assuming $NH_3$ is into all chillers at $-20°$ F. and out at 0° F., then $\Delta T_1 = \Delta T_2 = \Delta T_3 = 20°$ F.

From the above, $W_1 = 2080$ lb./hr.
$W_2 = 1850$ lb./hr.
$W_3 = 1390$ lb./hr.
$W_W = 1800$ lb./hr.

Using these values, then $$F_s = \frac{1.08[(1850)(20)+(2080)(20)+(1390)(20)] - (1800)(0.865)(9) - 5000}{1800(144)}$$

$F_s = 37$ percent.

From the above it can be seen that the operation of the system of this invention serves to give a controlled solids content of 37 percent.

In the specific example there are three chillers 17, 22 and 24 connected in series. Each of the chillers comprises seven scraped surface sections connected in parallel within a common jacket. Each chiller section is 6 inches in diameter and 30 feet in length. The surge tank is 30 inches in diameter and 35 feet long. The purification column is 24 inches in diameter and 15 feet long. The filter has 1530 square inches of area. The heater has an output of 75 kilowatts. There is an impulser associated with the purification column. The pulser displaces 60 cubic inches per cycle and operates from 200–300 cycles per minute. It is, of course, desirable to insulate the entire apparatus. Refrigeration unit has a capacity of 144 tons of refrigeration at $-10°$ F. output.

Although this invention has been described in conjunction with the concentration of beer as a specific example, it should be evident that it is not limited thereto. The invention can be employed to advantage to concentrate a variety of food products and beverages. Examples of these include milk, fruit juices, vegetable juices, vinegar, coffee, tea, wine, liquors and the like. In addition, the invention can be employed to separate various mixtures of organic materials. Numerous examples of mixtures of organic materials which can be separated are described in the Thomas Patent, 2,854,494. This invention is particularly useful when the components of the feed which is to be frozen comprise approximately 70 weight percent or more of the feed mixture. In separations of this type, it is important to increase the concentration in the feed of the component which is not frozen in order to permit more efficient operation. A multi-stage apparatus may also be utilized to provide this concentration. In this regard, it would be evident that more or fewer than three stages can be employed, depending upon the composition of the feed and the degree of separation desired.

The concentration of the non-freezing component of the feed to the chiller can be increased still further by recycling additional portions of the mother liquor. The amount of mother liquor recycled depends to a large extent upon the number of stages of separation employed and the degree of concentration required. It should be evident that the concentration of the final product is increased by recycling more mother liquor.

An analog computer of either the electronic or pneumatic type may be used. An electronic computer such as the Model TR–10 by Electronic Associates, Inc., may be employed. In addition, the computer may also be custom built from components supplied by Electronic Associates, Inc.

Reasonable variations and modifications are possible within the scope of the foregoing disclosure and discussion, the essence of which is that there has been provided a process comprising cooling a liquid multi-component mixture to form a slurry of solids in mother liquor, passing a slurry of solids in mother liquor to a purification zone, separating mother liquor from said slurry within said purification zone, moving solids through said purification zone toward a melting zone, melting solids in said melting zone, displacing a portion of the resulting melt into said moving solids, and recovering a purified product from said melting zone, the improvement comprising measuring the amount of heat removed from the multi-component mixture by the coolant used in cooling same and adjusting said cooling to regulate the solids content of the slurry being formed in response to said measurement.

I claim:

1. In a process which comprises cooling by heat exchange with a refrigerant a liquid multi-component mixture to form a slurry of solids in mother liquor, passing an effluent slurry of solids in mother liquor into a purification zone, separating mother liquor from said slurry within said purification zone, moving solids through said purification zone toward a melting zone, melting solids in said melting zone, displacing a portion of the resulting melt into said moving solids, and recovering a purified product from said melting zone, the improvement comprising establishing a first signal by measuring a temperature differential between the multi-component mixture and the solid slurry in the mother liquor, establishing a second signal by measuring the heat absorbed by the said refrigerant, establishing third and fourth signals, respectively, by measuring the flow rate of the respective multi-component mixture and the refrigerant, determining the fraction of solids in the effluent as a function of the said first, second, third, and fourth signals and the heat leaks into the system, and adjusting said cooling to regulate the solids content of the slurry being formed to a predetermined fraction based on the determination.

2. Fractional crystallization apparatus for obtaining a partially frozen slurry having a predetermined percentage of frozen solids from a multi-component liquid, comprising a heat exchanger, means for passing said liquid through said heat exchanger, means for passing a refrigerant through said heat exchanger in indirect heat exchanging relationship with said liquid, means for establishing a first signal by measuring a temperature differential between the multi-component liquid and the solid slurry in said liquid, means for establishing a second signal by measuring the heat absorbed by said refrigerant in said heat exchanger, means for establishing a third and fourth signal, respectively, by measuring the flow rate of the respective multi-component liquid and refrigerant, means to determine the fraction of solids in the partially frozen slurry as a function of the said first, second, third and fourth signals and the heat leaks into the system, and means responsive thereto to adjust the cooling in said heat exchanger so as to regulate the solids content of said partially frozen slurry at a predetermined level.

References Cited

UNITED STATES PATENTS

| | | | |
|---|---|---|---|
| 2,815,288 | 12/1957 | McKay | 99—205 |
| 2,977,234 | 3/1961 | Wenzelberger | 99—205 |
| 2,613,136 | 10/1952 | McKay | 23—273 |
| 2,890,938 | 6/1959 | Rush | 23—273 |
| 3,093,649 | 6/1963 | Ratjectal | 62—58 |
| 3,212,281 | 10/1965 | McKay | 62—58 |
| 3,212,283 | 10/1965 | Jackson | 62—135 |
| 3,255,598 | 6/1966 | Cottle | 62—58 |
| 3,232,069 | 2/1966 | Hawkins | 62—135 |

NORMAN YUDKOFF, *Primary Examiner.*

ABRAHAM H. WINKELSTEIN, *Examiner.*

R. S. AULL, G. P. HINES, *Assistant Examiners.*